(No Model.) 2 Sheets—Sheet 1.
D. DILLON.
FERTILIZER DISTRIBUTER.
No. 284,189. Patented Sept. 4, 1883.
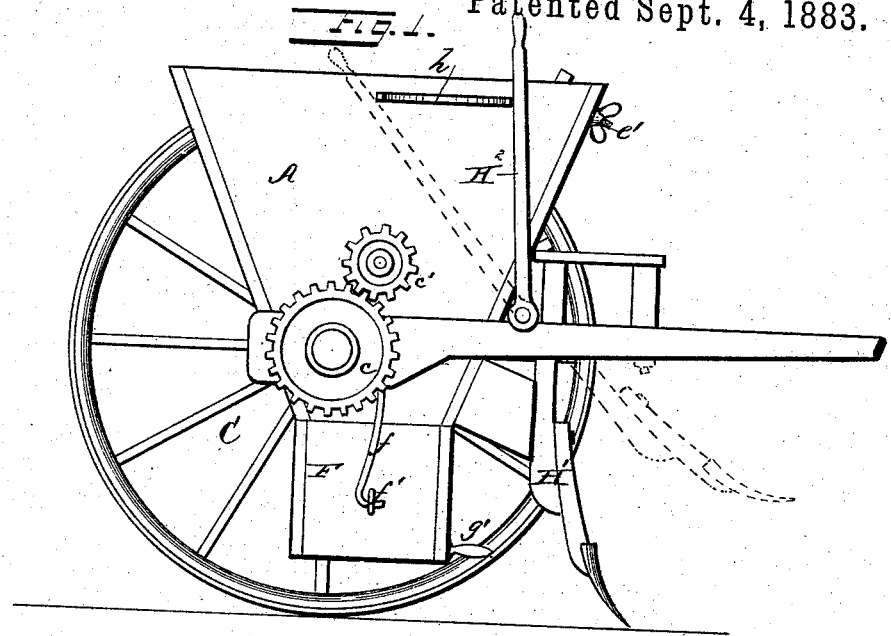
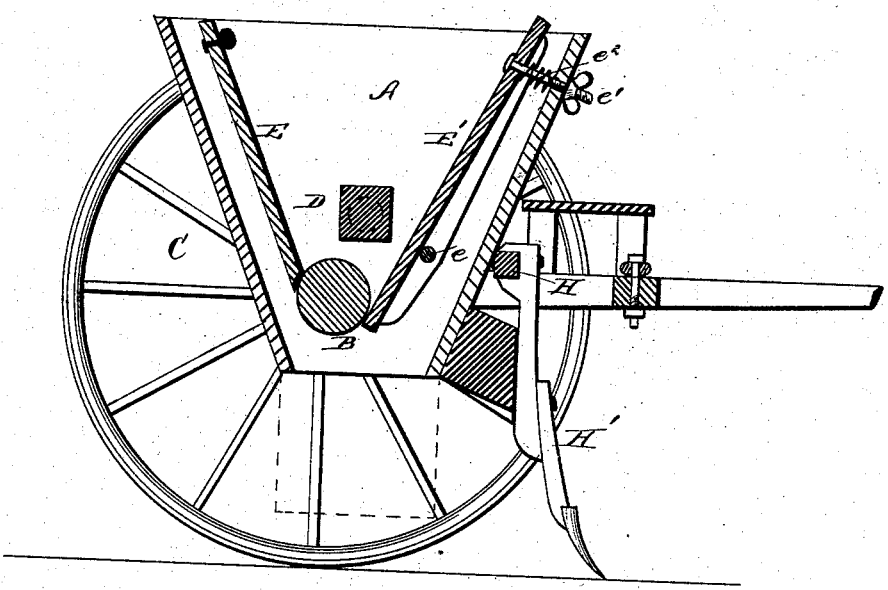

(No Model.) 2 Sheets—Sheet 2.
D. DILLON.
FERTILIZER DISTRIBUTER.
No. 284,189. Patented Sept. 4, 1883.
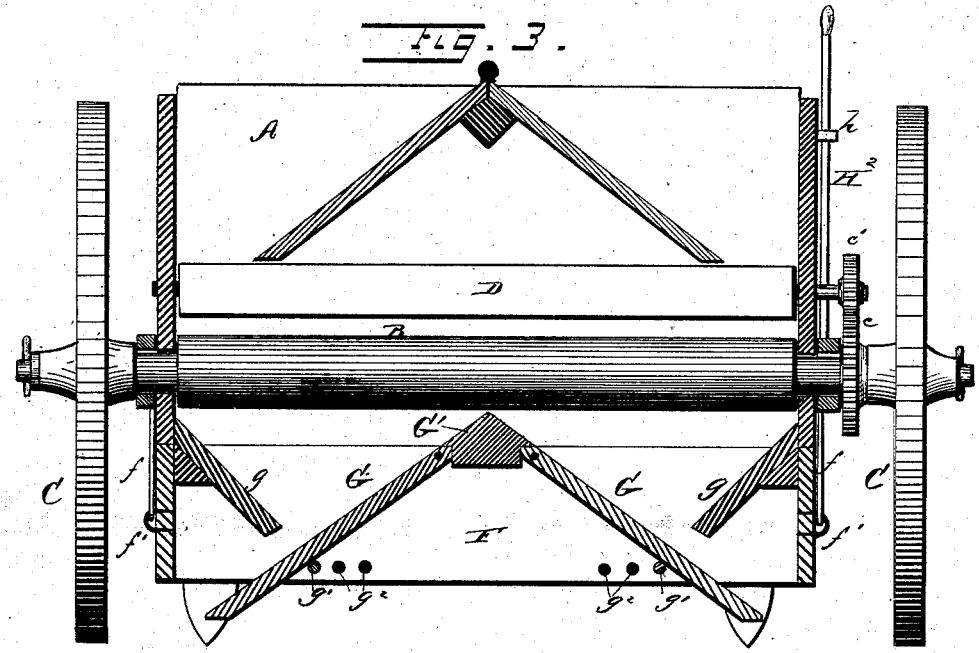
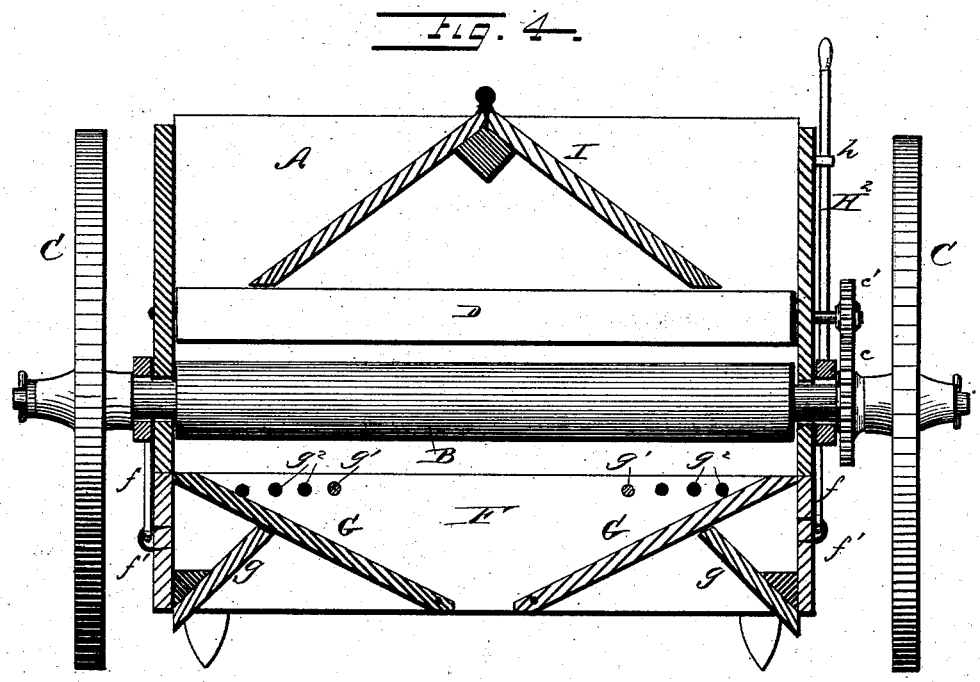

UNITED STATES PATENT OFFICE.

DANIEL DILLON, OF NASHVILLE, TENNESSEE.

FERTILIZER-DISTRIBUTER.

SPECIFICATION forming part of Letters Patent No. 284,189, dated September 4, 1883.

Application filed March 9, 1883. (No model.)

*To all whom it may concern:*

Be it known that I, DANIEL DILLON, a citizen of the United States of America, residing at Nashville, in the county of Davidson and State of Tennessee, have invented a new and useful Improvement in Fertilizer-Distributers, of which the following is a specification, to wit:

This invention relates to an improvement in fertilizer-distributers; and it consists in the peculiar construction and arrangement of the same, whereby the fertilizer may be drilled in one or two rows or sown broadcast, as may be desired, and the feed of the same from the hopper may be regulated, substantially as will be hereinafter more fully described.

In order to enable others skilled in the art to which my invention appertains to make and use the same, I will now proceed to describe its construction and operation, referring to the accompanying drawings, in which—

Figure 1 is a side elevation of the machine with one wheel removed. Fig. 2 is a central longitudinal section of the same. Fig. 3 is a transverse section, showing the device for drilling in two rows; and Fig. 4, a similar view arranged to drill in only one row.

A represents a hopper-shaped box, through which runs a roller, B, forming an axle, upon which are arranged the supporting-wheels C C. One of these wheels C is arranged to run loosely upon the axle or roller B, and the other is secured to and turns this roller with its forward motion to feed the fertilizer.

Upon one end of the axle or roller, outside the box A, is also secured a gear or belt wheel, $c$, connecting with and operating a similar pinion or pulley, $c'$, upon the outer end of a square shaft, D, journaled in the box just over the feed-roller, and acting as a stirrer within the hopper. The box A is provided on its inner sides with two inclined boards, E E', the former of which is arranged to slide vertically in grooves in the ends of the box, with its lower edge resting upon the roller B, and may be withdrawn to facilitate cleaning, and the latter is pivoted, as seen at $e$, and provided with a set-screw, $e'$, and spiral spring, $e^2$, by which its lower edge may be thrown to or from the feed-roller to regulate the flow of the fertilizer.

To the under side of the box A is secured, by hooks $ff$ and staples $f' f'$, a rectangular frame, F, provided on the inside, at each end, with a short incline, $g$, and with two pivoted boards, G G, hinged at their inner ends near the center of the frame, and inclining downward and outward beneath the inclines $g\ g'$, and their lower or outer ends are supported and rendered adjustable to and from the inclines $g\ g$ by means of pins $g'\ g'$, passing through a series of holes, $g^2$, in the frame. The upper inner ends of these boards do not meet, but have an opening between them, which is covered by a double-beveled block or cap, G'.

Across the forward side of the box A is journaled a rocking bar, H, provided with one or more shovel-blades, H', and at one end with a hand-lever, $H^2$, engaging with a rack, $h$, on the end of the box. The interior of the hopper is also provided with a removable double incline, I, adapted to throw the fertilizer from the center toward each end of the feeding-roller, and thus prevent too rapid feeding when drilling.

In operation, when it is desired to drill in two rows, the hopper A and frame F are arranged as represented in Fig. 3, and the opening-blades H' are lowered to open the ground. The machine, being then started, will feed the fertilizer out at each end of the box or frame F in two rows, corresponding to the furrow-openers. For drilling in one row the frame F is removed and turned over in the position shown by Fig. 4, and the cap G' being removed, the fertilizer is fed out through the central opening. For broadcast sowing, the frame F is entirely removed from the double incline I, taken out of the hopper, and the shovel H' raised from the ground.

The device is thus made applicable to any mode of distributing the fertilizer, and, if desired, the wheels may be removed and the hopper suspended from the rear end of a wagon-body, the feed-roller being operated by a belt or gear on the hub of one of the wagon-wheels.

It is obvious that, if desired, one or more covering devices may be attached to the box or hopper A, and arranged to be raised and lowered by a lever similar to the openers.

Having thus fully described my invention, what I claim as new, and desire to secure by Letters Patent, is—

1. The combination, with the hopper of a fertilizer-distributer and its feeding devices, of the removable and reversible frame F, hung beneath the hopper, and provided with adjustable inclines G G, stationary ones g g, and cap G', whereby the device is adapted to sow broadcast or drill in one or more rows, substantially as shown and described.

2. In a fertilizer-distributer, the box or hopper A, provided with a feed-roller, B, which serves also as an axle for the supporting-wheels, a stirrer, D, operated by connection with the feed-roll, and a hinged or pivoted feed-regulating board, E', having a spring and set-screw, in combination with the removable and reversible frame F, having the stationary inclines g g and hinged adjustable inclines G G, and the rocking shaft H, provided with the shovels H', and the handles H², all constructed and arranged to operate substantially as and for the purpose set forth.

In testimony whereof I affix my signature in presence of two witnesses.

DANIEL DILLON.

Witnesses:
P. F. LAURENCE,
A. H. ROBERTS.